US008345926B2

(12) United States Patent
Clark et al.

(10) Patent No.: US 8,345,926 B2
(45) Date of Patent: Jan. 1, 2013

(54) THREE DIMENSIONAL SCANNING ARRANGEMENT INCLUDING DYNAMIC UPDATING

(75) Inventors: Cameron Bruce Clark, Rolleston (NZ); Ian Timothy Viney, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 864 days.

(21) Appl. No.: 12/428,057

(22) Filed: Apr. 22, 2009

(65) Prior Publication Data
US 2010/0046800 A1   Feb. 25, 2010

Related U.S. Application Data

(60) Provisional application No. 61/090,915, filed on Aug. 22, 2008.

(51) Int. Cl.
*G06K 9/00* (2006.01)
*H04N 1/46* (2006.01)

(52) U.S. Cl. ........................................ 382/106; 358/505

(58) Field of Classification Search .................. 382/106, 382/131, 153, 193, 195, 318; 37/195, 343, 37/382, 348, 414; 348/67, 103, 106, 195, 348/201, 206, 262, 264; 358/408, 474, 487, 358/493, 505, 506
See application file for complete search history.

(56) References Cited

U.S. PATENT DOCUMENTS

| 6,363,173 | B1 * | 3/2002 | Stentz et al. ................. 382/195 |
| 6,363,632 | B1 * | 4/2002 | Stentz et al. ................... 37/414 |
| 7,139,651 | B2 * | 11/2006 | Knowlton et al. .............. 701/50 |
| 2003/0083796 | A1 | 5/2003 | Denton |

FOREIGN PATENT DOCUMENTS

| AU | 635 762 B2 | 4/1993 |
| DE | 41 33 392 C1 | 12/1992 |
| EP | 0 412 400 A1 | 2/1991 |
| WO | 94/01812 A1 | 1/1994 |
| WO | 97/01105 A1 | 1/1997 |
| WO | 2008/002898 A2 | 1/2008 |

OTHER PUBLICATIONS

International Search Report and Written Opinion pertaining to International application No. PCT/US2009/054245 dated Nov. 11, 2009.

* cited by examiner

*Primary Examiner* — Abolfazl Tabatabai
(74) *Attorney, Agent, or Firm* — Dinsmore & Shohl LLP

(57) ABSTRACT

A three dimensional machine scanning arrangement for a machine traveling over a worksite includes a pair of scanners that are mounted on the machine. Each of the pair of scanners measures distances to a number of points on the ground at the worksite. One of the pair of scanners faces rearward and the other of the pair of scanners is faces forward. A control is responsive to the pair of scanners. The control determines the contour of the worksite. A display, mounted on the machine, is responsive to the control for displaying the contour of the worksite.

12 Claims, 3 Drawing Sheets

THREE DIMENSIONAL SCANNING ARRANGEMENT INCLUDING DYNAMIC UPDATING

CROSS-REFERENCE TO RELATED APPLICATIONS

This application claims priority to U.S. Provisional Application 61/090,915, filed Aug. 22, 2008.

STATEMENT REGARDING FEDERALLY SPONSORED RESEARCH OR DEVELOPMENT

Not applicable.

BACKGROUND OF THE INVENTION

There is no current way of allowing a machine, such as a bulldozer or the like, to use real-time surface information for automatic machine control guidance system calculations. In the past, the actual surface generated by such a machine has been surveyed, after the machine has worked an area. It will be appreciated that surveying a worksite is time consuming.

Aerial photogrammetry methods have used lasers to map three dimensional terrain models. Using these methods, it has been possible to achieve 10 cm (3.94 inches) relative standard deviations of generated surfaces. This is not accurate enough for precise machine control applications, especially when absolute accuracies are required.

Current three dimensional control guidance systems use pitch from the design in control calculations for operation of the machine. However, the design surface does not always match the pitch of the actual surface on which the machine is operating. Prior art machine guidance systems map a surface generated by the machine by deriving surface information on the assumption that the blade cutting edge is skimming the surface. It will be appreciated that this is not always an accurate assumption.

Currently, the only way to measure machine control system performance is to survey the surface of the worksite before and after the machine is operated to re-contour the surface. While some prior art systems suggest scanning the area in front of a machine for avoidance detection or for determining the best cut locations for digging and determining machine locations, such as shown in U.S. Pat. Nos. 6,363,173, and 6,363,632, respectively, such systems do not provide for enhancement of machine operation and measurement of machine performance.

SUMMARY

A three dimensional machine scanning arrangement for a machine traveling over a worksite includes a pair of scanners that are mounted on the machine. Each of the pair of scanners measures distances to a number of points on the ground at the worksite. One of the pair of scanners faces rearward and the other of the pair of scanners is faces forward. A control is responsive to the pair of scanners. The control determines the contour of the worksite. A display, mounted on the machine, is responsive to the control for displaying the contour of the worksite.

The pair of scanners may comprise a pair of laser scanners which determine the position of a plurality of points on the ground in real time. The system may further include a total station for monitoring the position of the machine. The total station is located at a known location, and monitors the relative position of the machine, including the pair of scanners. The total station includes a transmitter for transmitting the position of the machine to the control. A receiver is associated with the control for receiving the position of the machine from the total station.

The scanning arrangement may include a memory for storing the contour of the worksite. The scanning arrangement may include one or more GNSS receivers carried on machine for determining the position and orientation of the machine. Alternatively, the scanning arrangement may include a laser transmitter which projects a reference beam of laser light, and one or more laser light detectors on the machine to detect the reference beam of light. The position of the one or more laser light detectors may be determined with respect to the laser transmitter and the position and orientation of the pair of scanners may be determined. Alternatively, the three dimensional machine scanning arrangement may include an inertial guidance system for determining the position and orientation of the machine including the position and orientation of the pair of scanners. The scanning arrangement may also include one or more inclinometers for determining the orientation of the machine.

A method of operating a worksite grading machine includes the steps of moving the machine over the worksite, and measuring distances to a number of points on the ground at the worksite with a pair of scanners on the machine. One of the pair of scanners is rearward facing to measure the relative position of points behind the moving machine, and the other of the pair of scanners is forward facing to measure the relative position of points in front of the moving machine. By this arrangement, the change in the worksite contour effected by the machine may be determined.

The method of operating a worksite grading machine may further include the step of displaying the contour of the worksite. The step of measuring distances to a number of points on the ground at the worksite with a pair of scanners on the machine may include the step of scanning in real time the points on the ground at the worksite using a pair of laser scanners.

The method of operating a worksite grading machine may further include the steps of monitoring the relative position of the machine, including the pair of scanners, with a total station located at a known location, transmitting the position of the machine from the total station to a control on the grading machine, and receiving at the control the relative position of the machine with respect to the total station. Alternatively, the method of operating a worksite grading machine may further include the step of monitoring the position of the machine using one or more GNSS receivers carried on machine for determining the position and orientation of the machine. Alternatively, the method may further include the steps of projecting a reference beam of laser light, and detecting the reference beam of laser light on the machine to determine machine position. Further, the method may include the step of using an inertial guidance system to determine the position and orientation of the machine, including the position and orientation of the pair of scanners. The method may further comprise the step of using one or more inclinometers to determine the orientation of the machine. The contour of the worksite may be determined on the fly as the machine moves over the worksite and the scanners on the machine assess the contour of the worksite surface. The control may provide a control output The control monitors may provide a control output to control operation of the machine based in part on the worksite contour. The control may determine when operation of the machine is to be modified based on the scanned contour of the worksite. The difference in elevation of the points scanned in front of the machine and the same points later scanned behind the machine is determined and used to calculate the volume of the dirt removed by the machine. The control may include a scanner, mounted on a machine, with the scanner measuring distances to a number of points on the ground at the worksite, with the scanner being either rearward facing or forward facing. A control is responsive to the scanner for determining the contour of the worksite. A display, mounted on the machine and responsive to the control, displays the contour of the worksite.

DETAILED DESCRIPTION OF THE PREFERRED EMBODIMENT

The scanning arrangement provides the ability for an earthmoving machine to update and map a three dimensional worksite surface dynamically from the earthmoving machine while it is being operated over a worksite. The information obtained may be used for a number of purposes, including automatic controls calculations, anticipating system power requirements such as hydraulic pressure and loading, system verification and validation, productivity calculations, and real-time work site terrain modeling. The ability to provide real-time data at the rear of the machine gives a redundant check and validation of three dimensional machine control system performance. Using this data in real time gives the machine control system the ability to fine tune the automatic controls to achieve required tolerances in the generated surface. This information, in particular the pitch of the surface, is used with automatic control calculations, and may also be used to prepare the machine for anticipated machine movement, for example by increasing the hydraulic pressure of the hydraulic system of the machine when required.

Figure 1:
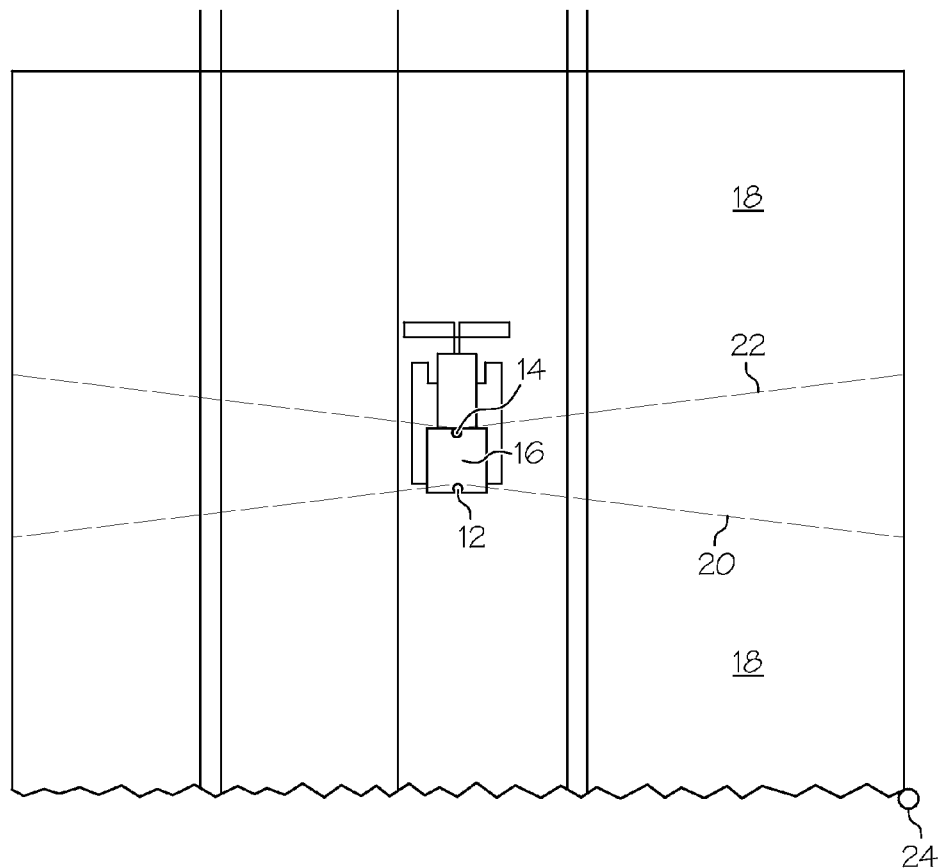
FIG. 1 is a plan view of a bulldozer incorporating an embodiment of the scanning arrangement.
Figure 2:
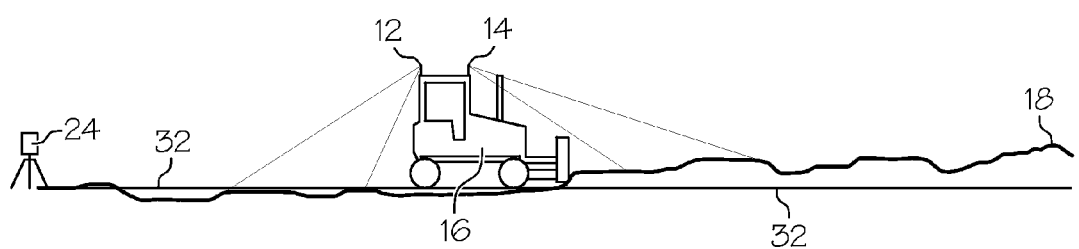
FIG. 2 is a side view of the bulldozer of FIG. 1, illustrating the scanning arrangement.
Figure 3:
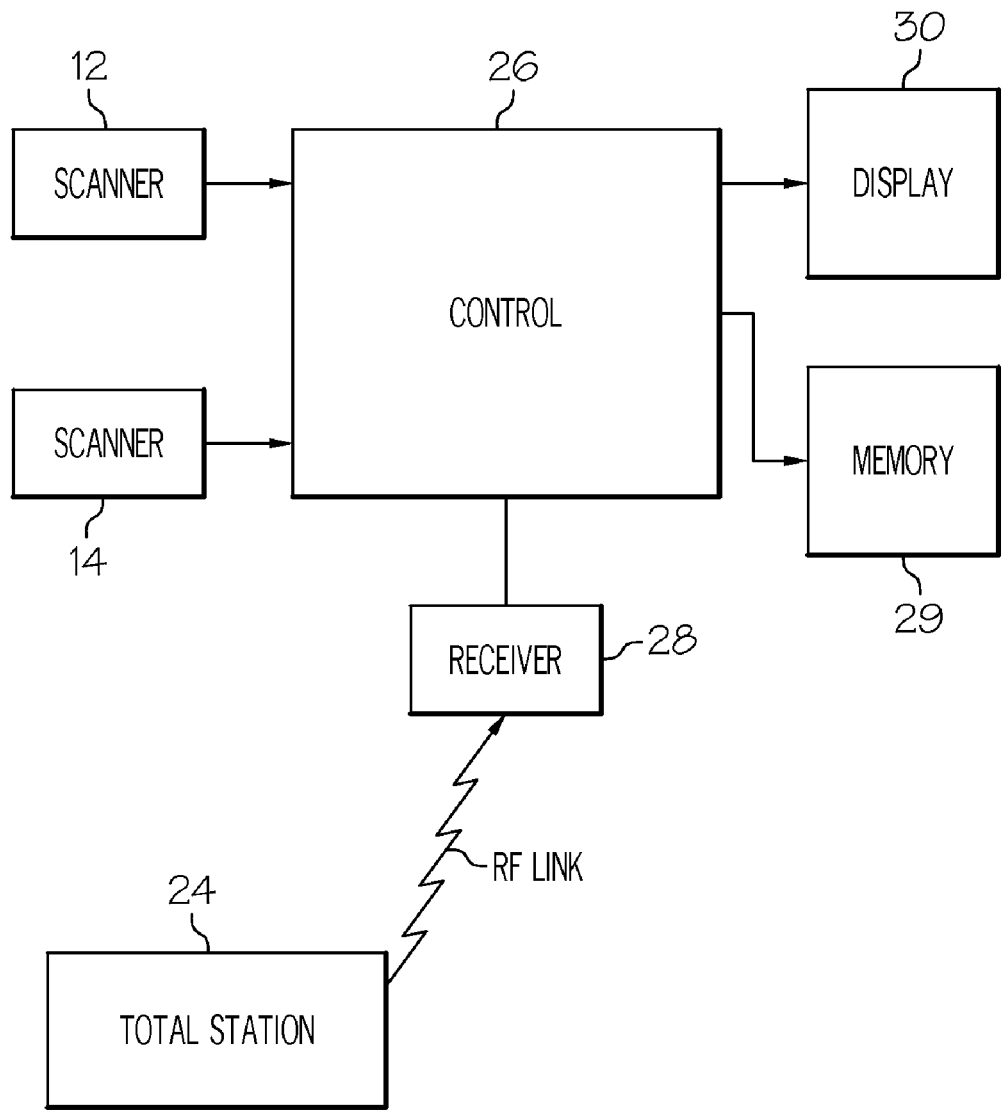
FIG. 3 is a schematic diagram, showing the manner in which data is handled by the scanning arrangement.

Reference is now made to FIGS. 1, 2 and 3 which illustrate an embodiment of the scanning system. To derive a dynamic, three-dimensional terrain model, the system includes a pair of scanners 12 and 14 that are mounted on the machine 16. The scanners 12 and 14 each continuously measure distances to a large number of points on the ground surface 18. This scanning is accomplished at high speed with each of the scanners 12 and 14 measuring on the order of 5000 points per second on the ground surface 18. The scanner 12 is rearward facing and scans the area generally behind line 20, while the scanner 14 is forward facing and scans the area generally forward of line 22. By scanning the surface 18 around the machine, points forward of line 22 and rearward of line 20 are scanned continuously as the machine 16 moves over a worksite. It will be appreciated that knowing the position of the machine 16 and the scanners 12 and 14 mounted on the machine is important in translating measurements that are relative to the machine into measurements that relate to a fixed coordinate system. It will also be appreciated that knowing the pitch, roll, and yaw of the machine 16 and the scanners 12 and 14 mounted on the machine is important in translating these measurements. By knowing the positions and orientations of the scanners 12 and 14, all measurements to points on the surface 18 can be converted into three dimensional data points with respect to a fixed reference system. Accumulating these three dimensional data points allows the system to generate a three dimensional terrain model.

One way of determining the position of the machine 16 with respect to a fixed coordinate system is to provide a target on the machine 16 and track the movement of the target with respect to a known reference point, that is, a reference point within the fixed reference system. An automated total station 24, positioned at a known reference point, may be used to track the target in this manner. As is known, a total station, such as a Trimble SPS930 robotic total station, or a Trimble 5605 robotic total station, may be used for this purpose. This will provide the position of the target, and by implication, the position of the machine. However, the orientation of the machine is not defined by simply determining the location of a fixed point on the machine. If desired, the orientation of the machine 16 may be assessed by utilizing multiple targets on the machine 16, with each of the multiple targets being tracked by the total station 24. For the orientation of the machine to be defined completely, the location of three points, and therefore, three targets on the machine must necessarily be determined.

The position of the scanners 12 and 14 may be determined by knowing the position of the machine 16 and its orientation. If desired, the targets to be tracked by the total station 24 may be mounted on the scanners 12 and 14. Utilizing a third target on the machine permits the total station to provide data that precisely define the position and orientation of the scanners 12 and 14. This data is transmitted from the total station 24 to the system control 26 via a radio frequency transmission to receiver 28. The three dimensional terrain model is then computed in the machine control 26 and stored in memory 29. The terrain model may also be displayed to the operator of the machine 16 on display 30. Calculating the positions of the scanners 12 and 14 with the total station 24 enables redundant checks to be made as to the accuracy of the generated terrain model.

This scanning system can be used in machine control systems where precise information on the generated surface is required for operation of the machine. Since it is able to derive a dynamic, three-dimensional terrain model for the worksite surface 18 in the area around the machine 16, the system can map, and display the contour changes produced by other machines, such as haul trucks, vibrating compactors, rollers, and the like. This scanning system can be used to calculate machine productivity information very precisely. The amount of material moved by the machine 16 can be calculated by comparing the surface 18 of the worksite in front of the machine to the surface 18 of the worksite at the rear of the machine. Over all areas of surface 18 where the machine has passed or mapped, an accurate volume calculation can be made, calculating the cut and fill required to achieve the final design surface. This scanning system provides on-the-fly statistical information on the generated surface, such as the surface standard deviation and average deviation. The output of the control 26 can also be used to benefit the operation of the machine 16. For example, the control system for machine 16 can anticipate loading on the machine hydraulics based on the terrain model, and can adjust the operation of the hydraulic system accordingly.

The information provided on the terrain surface 18 behind the machine 16 can also be used to enhance settings and control parameters to fine tune the machine 16. This fine tuning will help the machine achieve the desired design surface 32. This can anticipate or compensate for machine linkage wear and slop, hydraulic system latency (reaction speed), and blade wear. This system is suited to use on fine grading machines such as motor graders and small track tractors.

Figure 4:
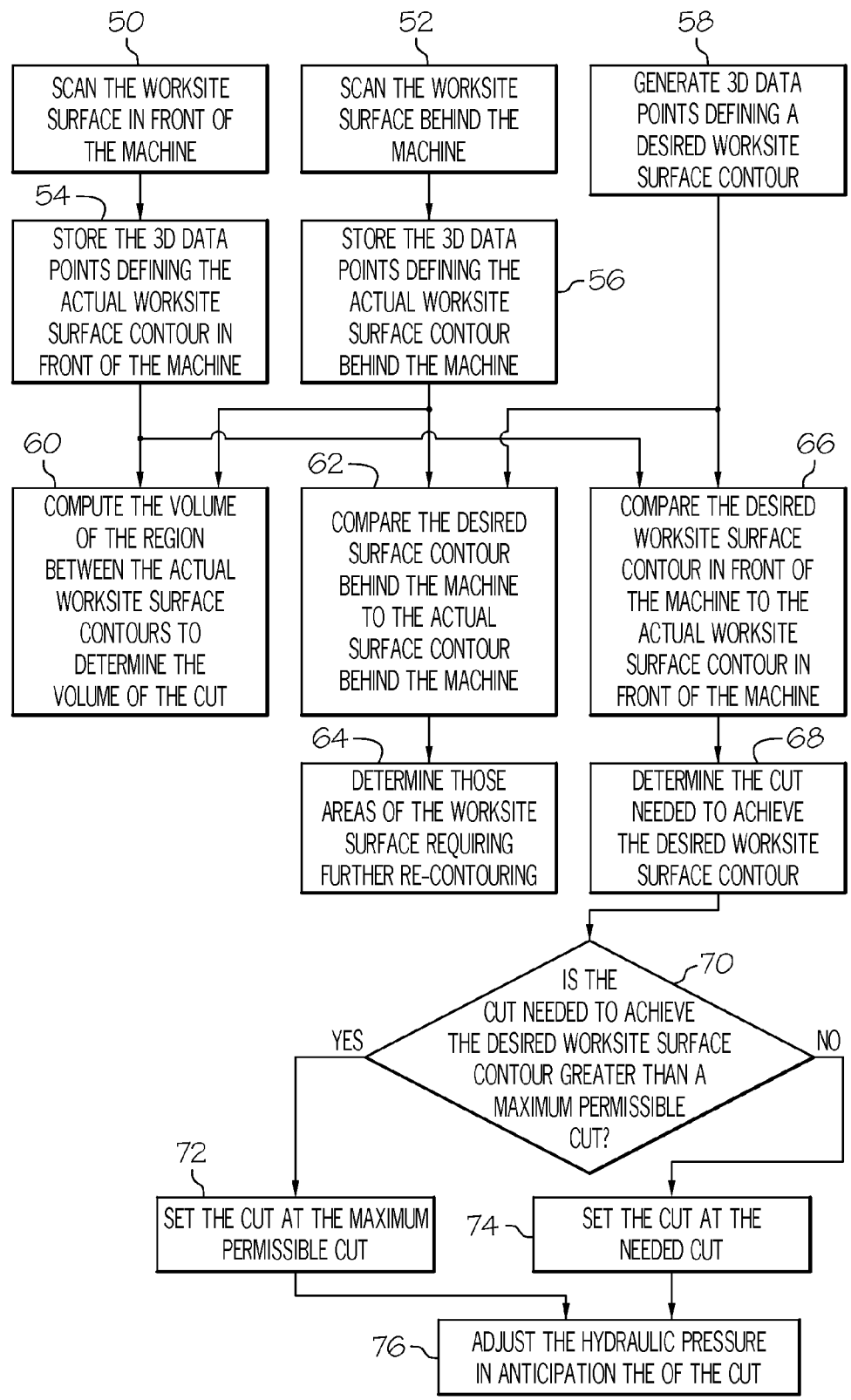
FIG. 4 is a flow chart, illustrating the manner in which data is handled by the scanning arrangement.

Reference is now made to FIG. 4, which illustrates the manner in which data is handled by the control 26. The worksite surface in front of the machine and behind the machine are scanned at 50 and 52, respectively, and the three dimensional data from these scanning operations are stored at 54 and 56, respectively. A desired finished contour for the worksite surface will also be prepared at 58 and made available for control of the system. With the scanned actual worksite surface contour data, both ahead of and behind the machine, and the desired worksite surface contour data, three functions may be accomplished.

First, the volume of the cut actually being accomplished is determined at 60 by determining the volume of space between the two surface contours, the actual surface contours ahead of the machine and behind the machine. Second, the desired surface contour is compared at 62 with the actual worksite surface contour behind the machine. Those areas of the worksite surface that require further work are note and stored at 64. Third, the desired worksite surface contour in front of the machine is compared to the actual worksite surface contour in front of the machine at 66. Based on this comparison, the cut that is needed to achieve the desired worksite surface contour is then determined at 68. An assessment is made at 70 as to whether the cut needed to achieve the desired worksite surface contour is greater than a maximum permissible cut, so that the machine will not be overloaded. If the cut is greater than the maximum permissible cut, then the cut is reduced to the maximum permissible cut at 72. If the cut is not greater than the maximum permissible cut, then the cut is maintained at the cut that is needed to achieve the desired worksite surface at 74. Finally, the level of hydraulic pressure in the machine hydraulic system may be adjusted at 76 in anticipation of the pressure level that will be needed to achieve the selected cut.

It will be appreciated that other techniques may be used to determine the position and orientation of the scanners 12 and 14. For example, if separate blade tip sensors are used for determining the position of a machine blade, the scanner positions may be assessed based on this information. GPS/GNSS receivers may be used on the machine 16 to determine machine position and orientation. Further, laser detectors may be provided on the machine and used in conjunction with one or more laser transmitters that project reference beams of laser light to determine machine position and orientation. Alternatively, inertial guidance may be used to perform this function. Further, the orientation of the machine 16 and, therefore, the orientation of scanners 12 and 14 may be determined with respect to gravity by means of inclinometers appropriately positioned on the machine 16.

Although the presently preferred embodiment has been described, it will be understood that various changes may be made therein within the scope of the following claims.

What is claimed is:

1. A method of operating a worksite grading machine, comprising the steps of:
moving the machine over the worksite,
measuring distances to a number of points on the ground at the worksite with a pair of scanners on the machine, one of said pair of scanners being rearward facing to measure the relative position of points behind the moving machine, and the other of said pair of scanners being forward facing to measure the relative position of points in front of the moving machine, whereby the change in the worksite contour effected by the machine may be determined.

2. The method of operating a worksite grading machine according to claim 1, further comprising the step of displaying the contour of said worksite.

3. The method of operating a worksite grading machine according to claim 1, in which the step of measuring distances to a number of points on the ground at the worksite with a pair of scanners on the machine includes the step of scanning in real time the points on the ground at the worksite using a pair of laser scanners.

4. The method of operating a worksite grading machine according to claim 1, further comprising the steps of monitoring the relative position of the machine, including the pair of scanners, with a total station located at a known location, transmitting the position of the machine from the total station to a control on the grading machine, and receiving at said control the relative position of the machine with respect to said total station.

5. The method of operating a worksite grading machine according to claim 4 in which the control provides a control output to control operation of the machine based in part on the worksite contour.

6. The method of operating a worksite grading machine according to claim 4 in which the control determines when operation of the machine is to be modified based on the scanned contour of the worksite.

7. The method of operating a worksite grading machine according to claim 1, further comprising the steps of monitoring the position of the machine using one or more GNSS receivers carried on machine for determining the position and orientation of the machine.

8. The method of operating a worksite grading machine according to claim 1, further comprising the steps of projecting a reference beam of laser light, and detecting the reference beam of laser light on the machine to determine machine position.

9. The method of operating a worksite grading machine according to claim 1, further comprising the step of using an inertial guidance system to determine the position and orientation of the machine, including the position and orientation of the pair of scanners.

10. The method of operating a worksite grading machine according to claim 1, further comprising the step of using one or more inclinometers to determine the orientation of the machine.

11. The method of operating a worksite grading machine according to claim 1 in which the contour of the worksite is determined on the fly as the machine moves over the worksite and the scanners on the machine assess the contour of the worksite surface.

12. The method of operating a worksite grading machine according to claim 1, in which the difference in elevation of the points scanned in front of the machine and the same points later scanned behind the machine is determined and used to calculate the volume of the dirt removed by the machine.

* * * * *